United States Patent
Gerlitzki (10) Patent No.: US 6,356,847 B1
(45) Date of Patent: Mar. 12, 2002

(54) METHOD AND DEVICE FOR DETERMINING THE TORQUE EXERTED ON A ROTATING BODY WHICH CAN BE ROTATIONALLY DRIVEN AROUND A ROTATIONAL AXIS

(76) Inventor: Siegfried Gerlitzki, Neue Schmiedgasse 24, Nierstein, D-55283 (DE)

(*) Notice: Subject to any disclaimer, the term of this patent is extended or adjusted under 35 U.S.C. 154(b) by 0 days.

(21) Appl. No.: 09/355,251
(22) PCT Filed: Nov. 26, 1998
(86) PCT No.: PCT/EP98/07620
  § 371 Date: Jul. 23, 1999
  § 102(e) Date: Jul. 23, 1999
(87) PCT Pub. No.: WO99/28717
  PCT Pub. Date: Jun. 10, 1999

(30) Foreign Application Priority Data

Nov. 27, 1997 (DE) .......................... 197 52 500
Nov. 25, 1998 (DE) .......................... 198 54 268

(51) Int. Cl.[7] .................................. G01L 1/00
(52) U.S. Cl. ............. 702/41; 73/862.28; 73/862.321; 73/862.326; 73/862.195; 324/76.82; 702/33
(58) Field of Search ............... 702/33, 41; 73/862.28, 73/862.321, 862.326, 862.195; 324/76.82

(56) References Cited

U.S. PATENT DOCUMENTS

| | | | |
|---|---|---|---|
| 3,871,215 A | | 3/1975 | Pratt, Jr. et al. ......... 73/862.28 |
| 4,020,685 A | * | 5/1977 | Van Millingen et al. .. 73/136 A |
| 4,513,628 A | | 4/1985 | Kohama et al. ....... 73/862.328 |
| 4,517,648 A | * | 5/1985 | Ina et al. ............... 364/431.01 |
| 4,532,599 A | * | 7/1985 | Smith ......................... 364/552 |

FOREIGN PATENT DOCUMENTS

| | | |
|---|---|---|
| DE | 4038413 | 6/1992 |
| DE | 19614744 | 10/1997 |

* cited by examiner

*Primary Examiner*—Arthur T. Grimley
*Assistant Examiner*—John Le
(74) *Attorney, Agent, or Firm*—Martin A. Farber (57) ABSTRACT

The invention relates to a method and a device for determining the torque exerted on a body of revolution 2 capable of being driven rotatably about an axis of rotation 1. The device possesses a first and a second measurement generator 3 and 4 which are arranged on the body of revolution 2 at an axial distance from one another and which consist of rings 7 and 8 radially surrounding the body of revolution 2 and composed of fields having an alternately different signal behavior. At the same time, the number of fields of the two rings 7 and 8 is identical. The first measurement generator 3 is assigned a first measurement transducer 9 and the second measurement generator 4 is assigned a second measurement transducer 10, the measurement transducers both supplying output signals, from which first and second square-wave signals 11 and 12 are formed, the torque being determined from the distances between edges of the first and second square-wave signals over one complete revolution of the body of revolution 2.

16 Claims, 6 Drawing Sheets

METHOD AND DEVICE FOR DETERMINING THE TORQUE EXERTED ON A ROTATING BODY WHICH CAN BE ROTATIONALLY DRIVEN AROUND A ROTATIONAL AXIS

FIELD AND BACKGROUND OF THE INVENTION

The invention relates to a method and a device for determining the torque exerted on a body of revolution capable of being driven rotatably about an axis of rotation, in particular on the bottom bracket bearing shaft of a bicycle, with a first and a second measurement generator which are arranged on the body of revolution at an axial distance or a radial distance from one another and which consist of rings radially surrounding the body of revolution and composed of fields having an alternately different signal behavior, the number of fields of the two rings being identical, with a first measurement transducer assigned to the first measurement generator and with a second measurement transducer assigned to the second measurement generator, said measurement transducers both supplying output signals, from which first and second square-wave signals are formed, the average torque being determined from the distances between edges of the first and second square-wave signals over one complete revolution of the body of revolution.

A method and a device of the type initially mentioned are known from DE 40 38 413 A1. Here, one of the rings with the fields having an alternately different signal behavior is interrupted by a reference mark. This means that a measurement cycle can commence only whenever the reference mark moves past the measurement transducer assigned to it. This may mean, in an extreme situation, that an almost complete revolution of the body of revolution must first take place before a measurement cycle can commence. Furthermore, only one support point in any torque profile within one complete revolution is detected by means of this method. The calculation of the average torque or work during one or more complete revolutions can therefore be carried out correctly only when the torque is constant.

Furthermore, it is difficult to detect very small angles of rotation and low torques on the body of revolution, since limits are set by the manufacturing tolerances of, in particular, the rings surrounding the body of revolution and having the fields.

SUMMARY OF THE INVENTION

The object of the invention is, therefore, to provide a method and a device of the type initially mentioned, by means of which, along with the simple design, a measurement cycle is started, essentially without delay, after the commencement of an application of torque and it becomes possible to detect the actual average torque and the work performed.

This object is achieved, according to the invention, in that the fields having an alternately different signal behavior form uninterrupted rings, in that, over one or more complete revolutions of the nonloaded torque-free body of revolution, the edge distances $T_{ml}$ between specific edges of the first square-wave signals and the distances $\alpha_{ml}$ of specific edges of the second square-wave signals from specific edges of the first square-wave signals are in each case summed up and the torque-free ratio $$\beta_{ml}=(\alpha_{ml1}+\alpha_{ml2}+\ldots \alpha_{min})/(T_{ml2}+T_{ml2}+\ldots T_{min})+\Sigma\alpha_{min}/\Sigma T_{min}$$

is formed, in that, over one or more complete revolutions of the body of revolution loaded with the torque to be determined, the edge distances $T_m$ between specific edges of the first square-wave signals and the distances am of specific edges of the second square-wave signals from specific edges of the first square-wave signals are in each case summed up and the applied-torque ratio $$\beta_m=(\alpha_{m1}+\alpha_{m2}+\ldots \alpha_{mn})/(T_{m1}+T_{m2}+\ldots T_{mn})=\Sigma\alpha_{mn}/\Sigma T_{mn}$$

is formed, in that the work on the applied-torque body of revolution is determined from the equation $$W=\int_0^{2\pi}Md\phi=\overline{M}\cdot 2\pi\approx(\beta_m-\beta_{ml})\cdot k,$$

k being a calibration constant and $\phi$ being the angle of rotation of the body of revolution, and in that the average torque exerted on the body of revolution is determined from the equation $$\overline{M}=W/2\pi\approx(\beta_m-\beta_{ml})\cdot k/2\pi.$$

The distances $T_{ml}$, $T_{ml}$, $\alpha_{ml}$ and $\alpha_m$ as well as the time t may, at the same time, be detected by means of a high-accuracy counter having a high oscillator frequency. The torque-free ratio $\beta_{ml}$ produces a reference value which already contains tolerance-induced deviations in the fields having a different signal behavior and the distances $\alpha_{ml}$. This makes it possible, on the one hand, to produce the fields cost-effectively and at low outlay, since there are no high tolerances which have to be adhered to. On the other hand, the rings radially surrounding the body of revolution may be arranged on the latter, with their fields being assigned to one another in any way desired, thus making production considerably simpler and cheaper, and requiring no adjustment work. Since a measurement cycle always extends over one or more complete revolutions of the body of revolution, there is not only compensation of the tolerance-induced deviations of the fields, but a measurement cycle can also commence at any specific edge of the first square-wave signals, which means that, if there is a corresponding number of fields, the first measurement cycle already starts almost immediately after the commencement of the introduction of torque. There is no need to wait until a reference mark triggers a signal.

Furthermore, due to tolerance compensation, it is also possible to determine very low torques with high accuracy.

Over and above the average torque, the average power can also be formed according to the equation $$\overline{P}=W/t=(\beta_m-\beta_{ml})\cdot k/t,$$

t being the time of one or more complete revolutions of the body of revolution.

So that variations in the application of torque to the body of revolution can be indicated in a simple way, one or more further measurement cycles may be carried out automatically after a measurement cycle has elapsed.

Since the calibration constant and the torque-free ratio $\beta_{ml}$ are invariable quantities, in order to reduce the computer capacity, the calibration constant k and/or the torque-free ratio $\beta_{ml}$ may be determined in a separate procedure and stored retrievably as constant storage values for each torque determination.

In order to form the torque-free ratio $\beta_{ml}$ or the applied-torque ratio $\beta_m$, the edge distances between the adjacent equally directed or the adjacent oppositely directed edges of the first square-wave signals may be summed up.

In the same way, in order to form the torque-free ratio $\beta_{ml}$ or the applied-torque ratio $\beta_m$, the distances of specific edges of the first square-wave signals from the adjacent equally directed or adjacent oppositely directed edges of the second square-wave signals may be summed up.

If very high torques are applied to the body of revolution, the torsion of the latter may lead to a distance $\alpha_m$ extending beyond the end of the distance $T_m$ assigned to it into the next following distance $T_{ml}$. This would result in false determination of the torque. In order to avoid such false torque determination, when the torque-free ratio $\beta_{ml}$ is formed, the distances $\alpha_{ml}$ between specific edges of the second square-wave signals may be compared with a specific predetermined edge distance $\alpha_{max}$ and, if $\alpha_{ml} > \alpha_{max}$ is detected, the measurement cycle may be discontinued and a new measurement cycle may be commenced, in which, instead of the distances $\alpha_{ml}$, those distances $\alpha_{ml}'$ are summed up, the start of which corresponds to the start of $\alpha_{ml}$ and the ends of which are those oppositely directed edges of the second square-wave signals which precede the ends of the distances $\alpha_{ml}$.

In order to avoid further torque detection when the body of revolution is at a standstill or virtually at a standstill after torque has been detected, after the commencement of a measurement cycle for determining the torque the instantaneous rotational speed or angular speed of the body of revolution may be detected and compared with a specific limit value of the rotational speed or angular speed, and the measurement cycle may be discontinued if the said speed falls short of the limit value. As soon as the angular speed or the rotational speed exceeds the specific limit value again, a measurement cycle is started again immediately with the specific edge of the first square-wave signals which is next detected.

So that the detected torque profile can be comprehended by an observer, the specific torque may be indicated on an indicator.

Furthermore, for further communication of information, it is advantageous if, in addition to the torque, further quantities capable of being derived from the torque are indicated on the indicator.

In a simple embodiment of a device for carrying out the method, the signals detected by the first and second measurement transducers are fed to an electronic computer unit which has memories for storing the torque-free ratio $\beta_{ml}$ and/or the calibration constant k and/or the specific limit value of the rotational speed or angular speed of the body of revolution and/or the specific edge distance $\alpha_{max}$ and by which an output signal corresponding to the torque to be determined can be generated.

So that the torque values determined are capable of being read off, an indicator unit may be capable of being activated by the output signal from the computer unit.

If the electronic computer unit is a microcontroller or microcomputer, this saves construction space.

In principle, the first and second measurement generators and measurement transducers may operate by the most diverse methods, such as, for example, optical, capacitive or inductive methods. It is also perfectly possible for the first measurement generators and measurement transducers to operate by a method other than that of the second measurement generators and measurement transducers. In an advantageous development, however, the first and/or the second measurement generators comprise fields having an optically different signal behavior and the first and/or the second measurement transducers are transducers detecting an optically different signal behavior.

In this case, depending on the construction space available, the first and/or the second measurement generators may consist of a measuring disk or a measuring cylinder which has the fields with a different signal behavior on its radial plane face or on its cylindrical outer face.

The fields may have a different reflex behavior, and this may be achieved, for example, in that the fields have alternately high and low reflection.

Another possibility is for the fields to be formed alternately by slits and diaphragm portions of the measuring disk.

BRIEF DESCRIPTION OF THE DRAWINGS

Exemplary embodiments of the invention are illustrated in the drawing and are described in more detail below. In the drawings.

DETAILED DESCRIPTION OF THE PREFERRED EMBODIMENTS

Figure 1:
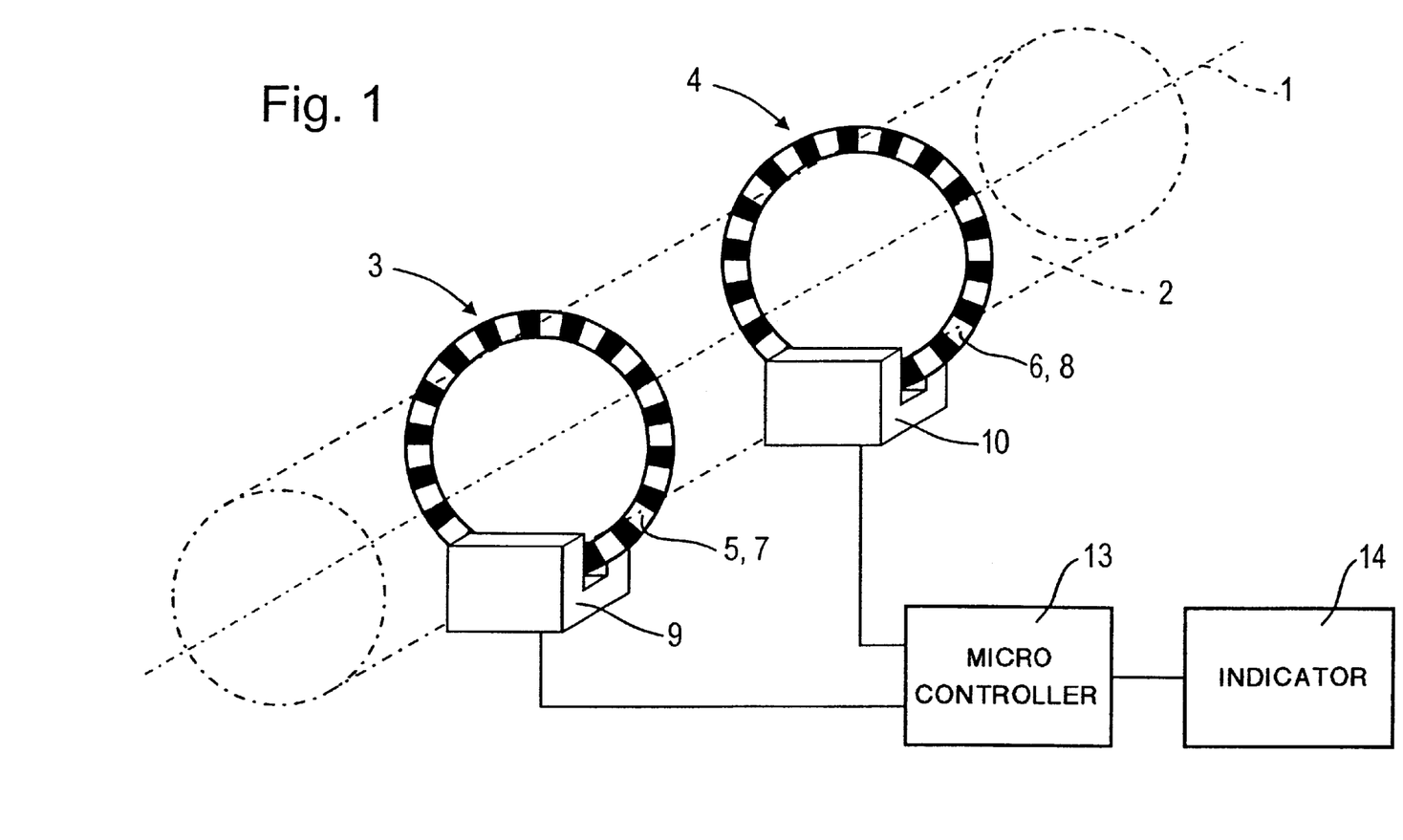
FIG. 1 shows a perspective view of a first exemplary embodiment of a device for determining the torque exerted on a body of revolution capable of being driven rotatably about an axis of rotation.
Figure 2:
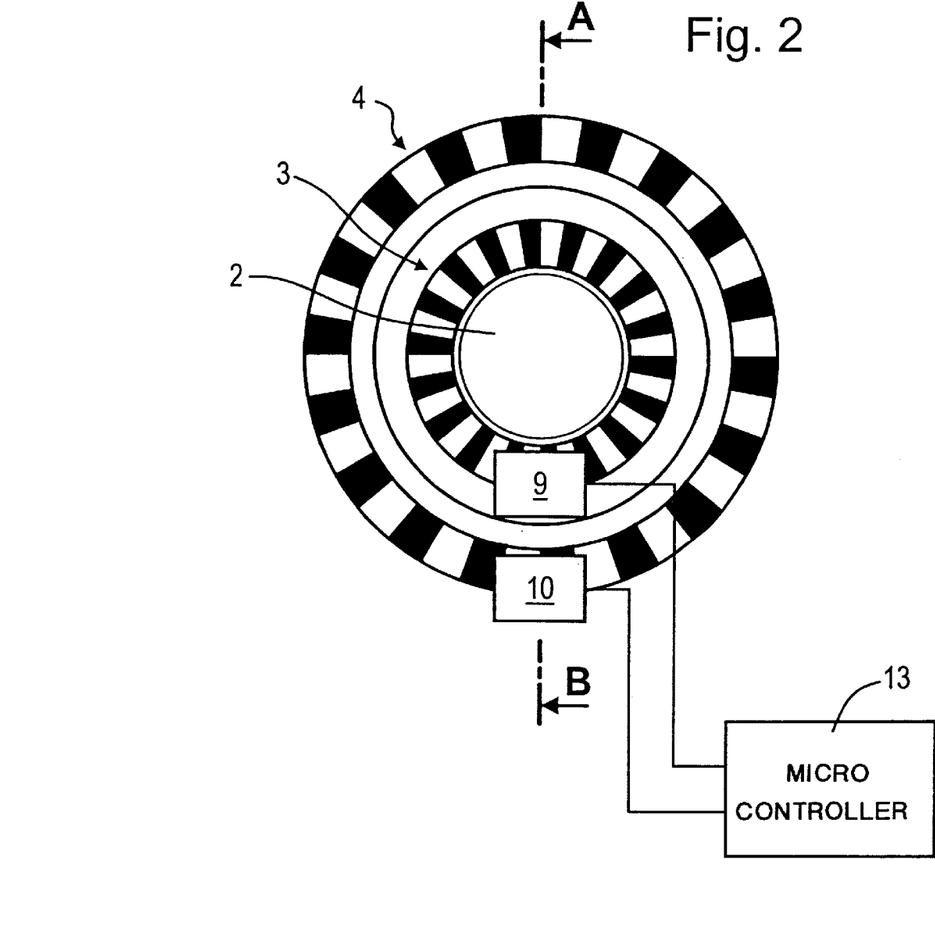
FIG. 2 shows a side view of a second exemplary embodiment of a device for determining the torque exerted on a body of revolution capable of being driven rotatably about an axis of rotation.
Figure 3:
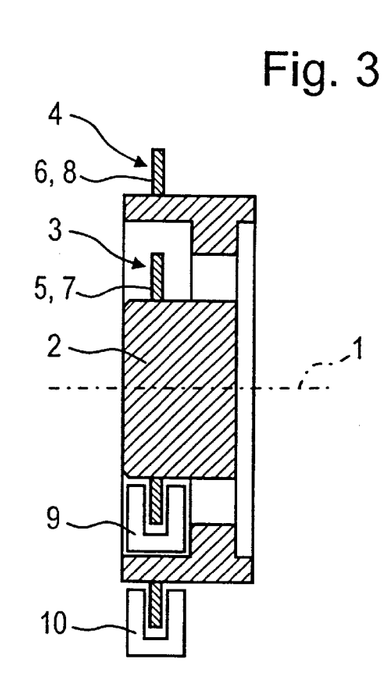
FIG. 3 shows the device according to FIG. 2 in section.

The devices of FIGS. 1 to 3 have bodies of revolution 2 capable of being driven rotatably about an axis of rotation 1, in FIG. 1 the body of revolution being the bottom bracket bearing shaft of a bicycle.

A first measurement generator 3 and a second measurement generator 4 are arranged fixedly in terms of rotation on the body of revolution 2 at an axial distance from one another in FIG. 1 and at a radial distance from one another in FIGS. 2 and 3. The measurement generators 3 and 4 consist of peripheral measuring disks 5 and 6 which are oriented radially to the axis of rotation 1 and to which are attached uninterrupted rings 7 and 8 radially surrounding the body of revolution and composed of alternately light and dark fields. The numbers of fields of the two rings 7 and 8 are identical.

Each of the measurement generators 3 and 4 is assigned a fixed optical measurement transducer 9 and 10, by means of which square-wave signals are generated according to the respective movement of the light and dark fields of the rings 7 and 8 past said measurement transducers.

The measurement transducer 9 generates first square-wave signals 11 and the second measurement transducer 10 generates second square-wave signals 12. Both square-wave signals are fed to a microcontroller 13 and, in this, the torque acting on the body of revolution 2 is determined. A corresponding output signal from the microcontroller 13 is fed to an indicator 14 and is indicated as a torque value.

Figure 4A:
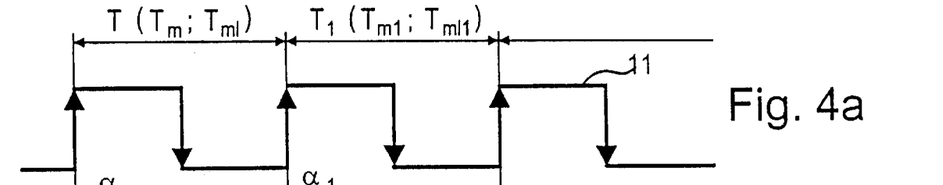
FIG. 4a shows a signal diagram of the first square-wave signals against time.

FIG. 4a illustrates a signal diagram of the first square-wave signals 11 generated by the first measurement transducer 9, in which diagram the distances between the successive rising edges are the edge distances T. The square-wave signals 12 generated by the second measurement transducer 10 and assigned to the signal diagram 4a are illustrated in the signal diagram in FIG. 4b.

Figure 4B:
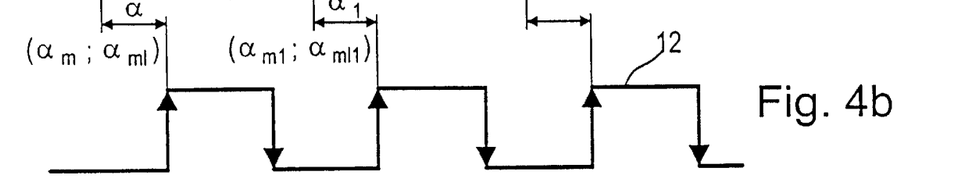
FIG. 4b shows a signal diagram of the second square-wave signals against time, said signal diagram being assigned to the signal diagram according to FIG. 4a, FIG. 5 shows a second signal diagram of the first square-wave signals against time.

The distances between the rising edges of the square-wave signals 11 and the next following rising edges of the square-wave signals 12 are the edge distances $\alpha$.

As described further below, for torque determination all the edge distances T and all the edge distances $\alpha$ of one complete revolution of the body of revolution 2 are summed up.

Figure 5:
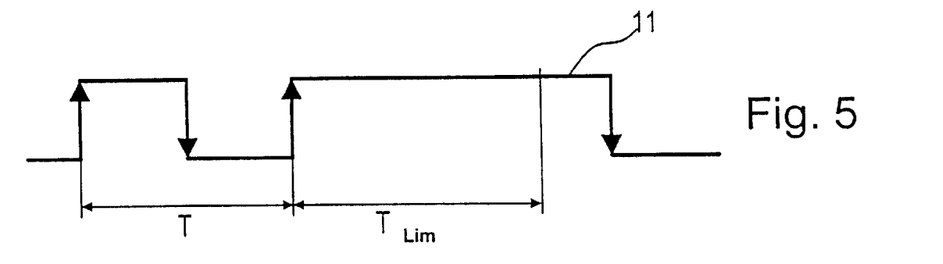

If, according to FIG. 5, the rotational movement of the body of revolution 2 is so slight that an edge distance T is greater than a predetermined maximum edge distance $T_{lim}$, this is detected by the microcontroller 13 and a measurement cycle which has commenced is discontinued.

A new measurement cycle can then commence again immediately with the next rising edge, so that there is no delay.

Figure 6A:
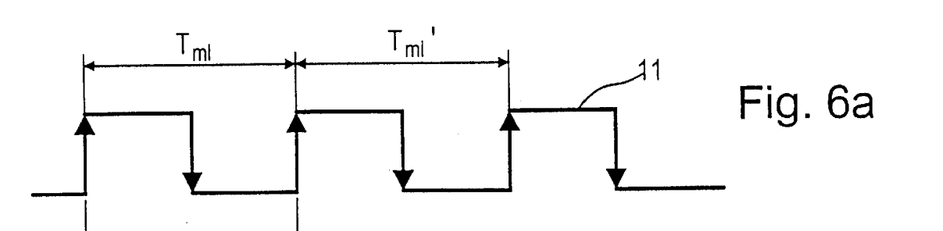
FIG. 6a shows a third signal diagram of the first square-wave signals against time.
Figure 6B:
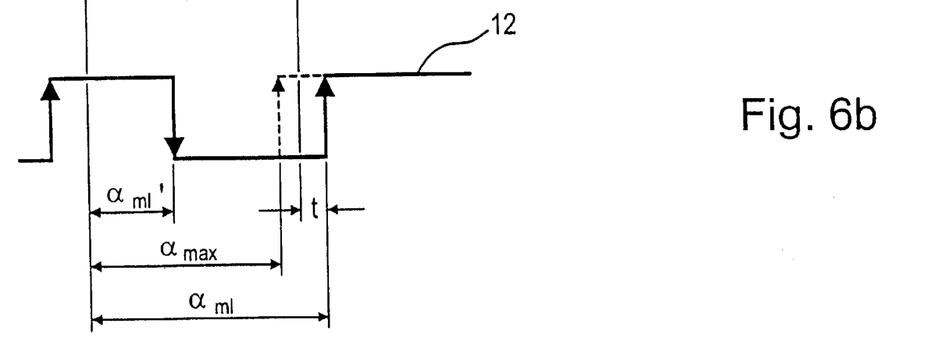
FIG. 6b shows a signal diagram of the second square-wave signals against time, said signal diagram being assigned to the signal diagram according to FIG. 6a, FIGS. 7a and 7b show a flow diagram of a method for determining the torque exerted on a body of revolution capable of being driven rotatably about an axis of rotation.

In the signal diagrams of the first and second square-wave signals 11 and 12 in FIGS. 6a and 6b, said signal diagrams being assigned to one another, the torsion of the body of revolution 2 would be so high, on account of a very high torque acting on the latter, that the next rising edge of the second square-wave signals 12 which follows a rising edge of the first square-wave signals 11 would be generated only after a further rising edge of the first square-wave signals 11 has already been generated before a time $t_0$. However, useful torque determination would therefore not be possible.

In order to avoid this, the microcontroller 13 detects when the edge distance $\alpha_{ml}$ is greater than a specific edge distance $\alpha_{max}$ during the formation of the torque-free ratio $\beta_{ml}$. If this is so, this measurement cycle is discontinued and a new measurement cycle commenced, in which the edge distance $\alpha_{ml}$ between a rising edge of the first square-wave signal 11 and the next following rising edge of the second square-wave signal 12 is no longer used to determine $\beta_{ml}$, but, instead, the distance $\alpha_{ml}'$ between a rising edge of the first square-wave signal 11 and the next following falling edge of the second square-wave signal 12 is used.

Figure 7A:
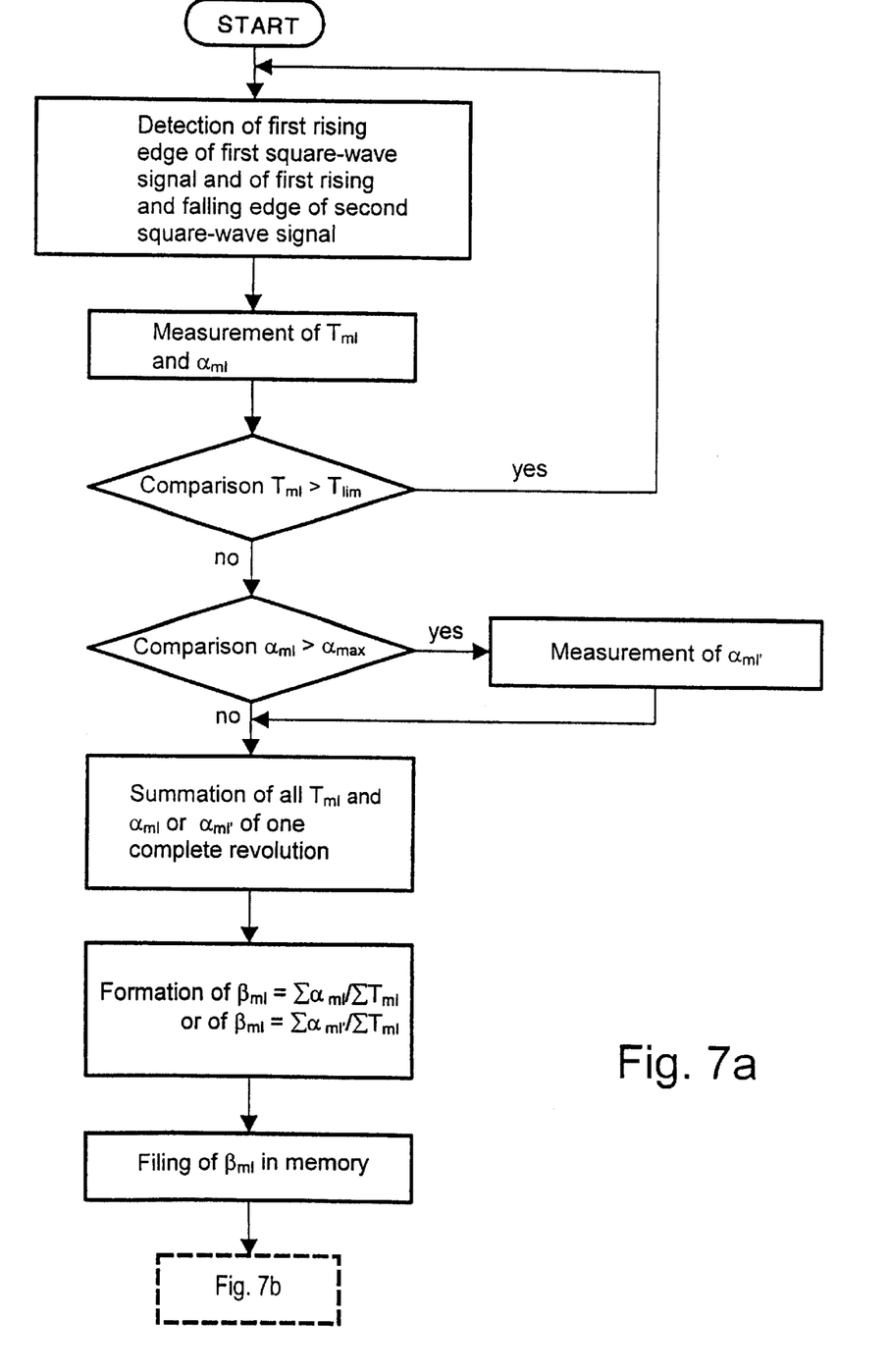
Figure 7B:
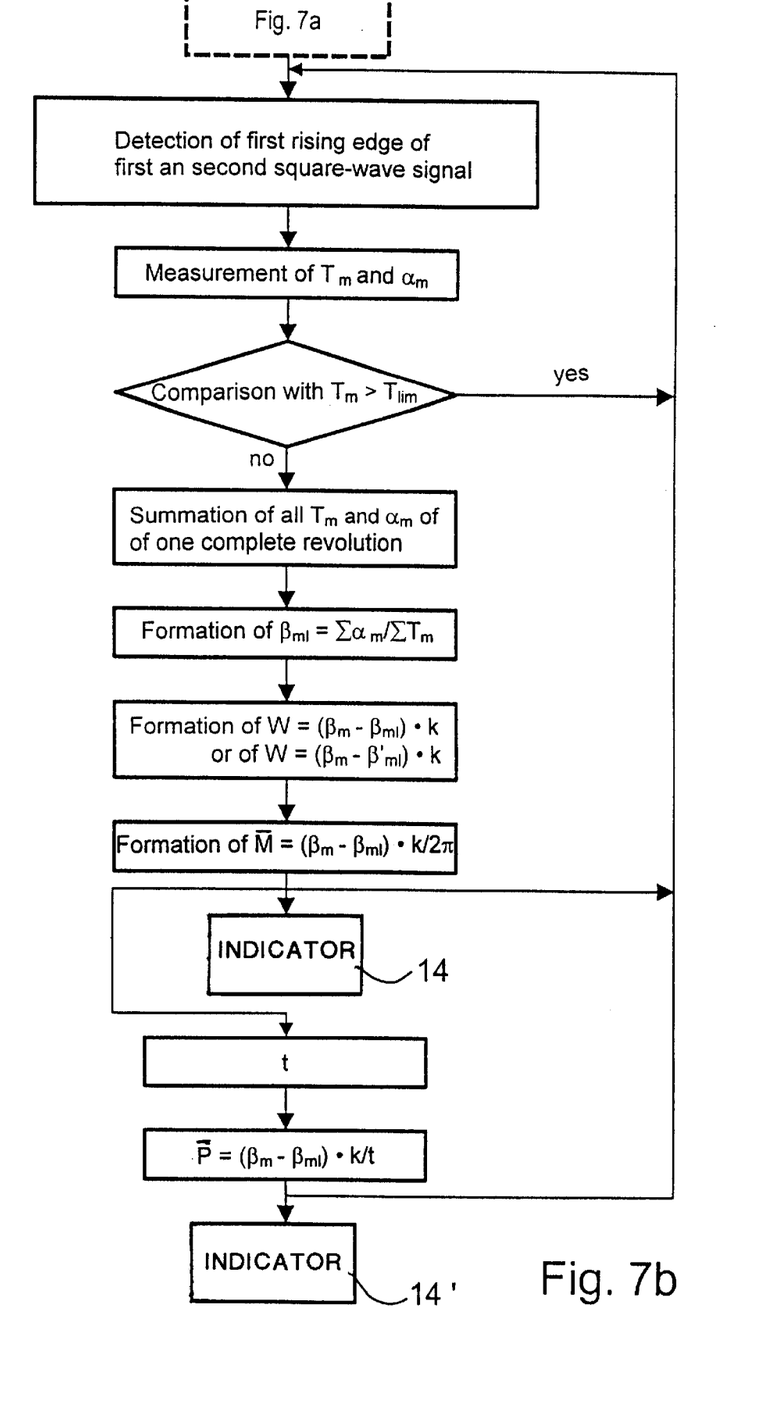

FIG. 7 illustrates the sequence of the method for determining the torque exerted on the body of revolution 2 capable of being driven rotatably about the axis of rotation 1. Here, an initializing procedure takes place first, in which an essentially torque-free ratio $\beta_{ml}$ is determined when there is no torque applied to the body of revolution 2. This initializing procedure preferably does not take place during each torque determination, but only when the device is first put into operation. The value of the torque-free ratio $\beta_{ml}$ is then filed in a memory of the microcontroller 13 and can be retrieved for future torque determinations. At the commencement of the measurement cycle of the initializing procedure, the first rising edge of the first square-wave signal 11 is detected and the distance in time $T_{ml}$ to the next rising edge is measured. A comparison of the measured distance $T_{ml}$ with a predetermined maximum distance in time $T_{lim}$ filed in a memory of the microcontroller 13 is then carried out.

If $T_{ml}$ is greater than $T_{lim}$, the measurement cycle is discontinued and a new measurement cycle is started.

At the commencement of the measurement cycle, measurement of the distance in time $\alpha_{ml}$ between the first rising edge of the first square-wave signal 11 and the next following rising edge of the second square-wave signal 12 was continued by the counter of the microcontroller 13. This distance in time $\alpha_{ml}$ is then compared with a maximum edge distance $\alpha_{max}$ filed in the memory of the microcontroller 13.

If $\alpha_{ml} > \alpha_{max}$, the measurement cycle is discontinued and a new measurement cycle started, in which, instead of $\alpha_{ml}$, that distance $\alpha_{ml}'$ is measured which is the distance in time between the first rising edge of the first square-wave signal 11 and that falling edge of the second square-wave signal 12 which precedes the next following rising edge of said second square-wave signal 12.

Both all the distances $T_{ml}$ measured during one complete revolution or the specific number of complete revolutions and the measured distances $\alpha_{ml}$ or, if $\alpha_{max}$ is exceeded, all the measured distances $\alpha_{ml}'$ are subsequently summed up to the sum $T_{ml}$ and to the sum $\alpha_{ml}$. The torque-free ratio $$\beta_{ml}=(\alpha_{ml1}+\alpha_{ml2}+\ldots \alpha_{min})/(T_{ml1}T_{ml2}+\ldots T_{min})=\Sigma\alpha_{min}/\Sigma T_{min}$$

is formed from these sums in the microcontroller 13 and is filed in a memory of said microcontroller.

An applied-torque ratio $$\beta_{ml}=(\alpha_{ml1}+\alpha_{ml2}+\ldots \alpha_{min})/(T_{ml1}+T_{ml2}+\ldots T_{min})=\Sigma\alpha_{min}/\Sigma T_{min}$$

is then determined, always by the same method steps, as in subsequent torque determinations, with the exception of the comparison with $\alpha_{max}$, on the body of revolution 2, to which the torque to be determined is applied.

Figure 8:
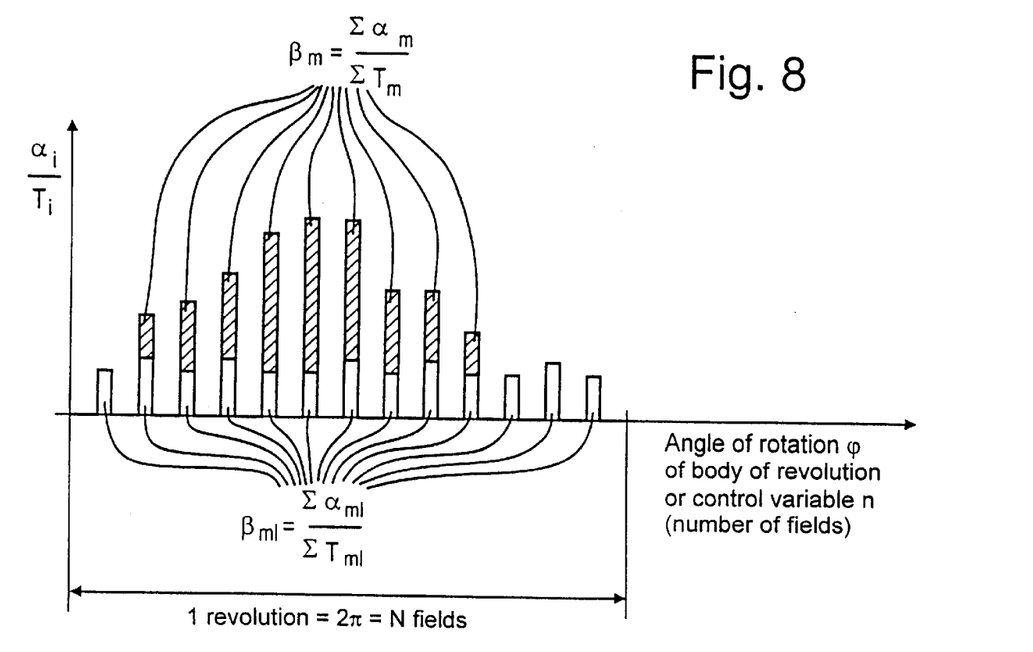
FIG. 8 shows a diagram of the torque-free ratios $\beta_{ml}$ added to the applied-torque ratios $\beta_{ml}$ over one complete revolution of the body of revolution and FIG. 9 shows a diagram of the torques over one complete revolution of the body of revolution.

In FIG. 8, the torque-free ratios of $\beta_{ml}$, added to the applied-torque ratios $\beta_m$, are plotted as bars for the individual fields of the rings 7 and 8 of the body of revolution 2 over one complete revolution of said body of revolution in a diagram. In this, the bar parts $\beta_m$, filled in dark, and the light bar parts $\beta_{ml}$ correspond.

The work acting on the body of revolution is determined from $\beta_{ml}$ filed in the memory and the determined $\beta_m$ in the microcontroller 13 according to the relation $$W=\int_0^{2\pi} Md\phi = \overline{M}\cdot 2\pi \approx (\beta_m - \beta_{ml})\cdot k.$$

In this, k is a calibration constant which has been determined separately and filed in a memory of the microcontroller 13.

The microcontroller 13 calculates from the work the average torque of one or more complete revolutions by means of the equation $$\overline{M}=W/2\pi \approx (\beta_m - \beta_{ml})\cdot k/2\pi$$

and feeds a corresponding signal to the indicator 14 for activating the latter, and a new measurement cycle is triggered.

Figure 9:
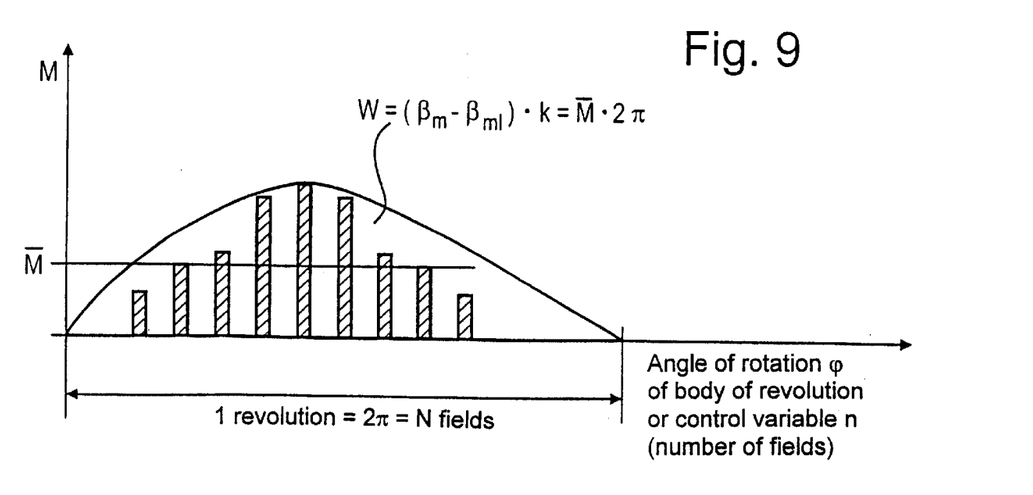

In FIG. 9, the torques are plotted as bars for the individual fields of the body of revolution 2, likewise over one complete revolution of said body of revolution 2 in a diagram, and are surrounded by an enveloping curve. The average torque M is obtained from the individual torques.

As may be gathered from the flow diagram in FIG. 7, furthermore, the average power may also be determined.

The time t of the one or more complete revolutions of the body of revolution is also obtained from the detected distances in time $T_m$. The average power is determined from this according to the equation $$\overline{P} = W/t \approx (\beta_m - \beta_{ml}) \cdot k/t,$$

and a corresponding signal is fed to the indicator 14' in order to activate the latter.

I claim:

1. A method for determining the torque exerted on a body of revolution capable of being driven rotatably about an axis of rotation, in particular on a bottom bracket bearing shaft of a bicycle, with a first and a second measurement generators which are arranged on the body of revolution at an axial distance or a radial distance from one another and which consist of rings radially surrounding the body of revolution and composed of fields having an alternately different signal behavior, the number of fields of two rings being identical, with a first measurement transducer assigned to the first measurement generator and with a second measurement transducer assigned to the second measurement generator, said measurement traducers both supplying output signals, from which first and second square-wave signals are formed, the average torque being determined from the distances between edges of the first and second square-wave signals over one complete revolution of the body of revolution, wherein the fields having an alternately different signal behavior form uninterrupted rings (7, 8), wherein, over one or more complete revolutions of a nonloaded torque-free body of revolution (2), the edge distances $T_{ml}$ between specific edges of the first square-wave signals (11) and the distances $\alpha_{ml}$ of specific edges of the second square-wave signals (12) from specific edges of the first square-wave signals (11) are in each case summed up and the torque-free ratio $$\beta_{ml} = (\alpha_{ml1} + \alpha_{ml2} + \ldots \alpha_{min})/(T_{ml1} + T_{ml2} + \ldots T_{min}) = \Sigma\alpha_{min}/\Sigma T_{min}$$

is formed, wherein, over one or more complete revolutions of the body of revolution (2) loaded with the torque to be determined, the edge distances $T_m$ between specific edges of the first square-wave signals (11) and the distances $\alpha_m$ of specific edges of the second square-wave signals (12) from specific edges of the first square-wave signal (12) are in each case summed up and the applied-torque ratio $$\beta_m = (\alpha_{ml1} + \alpha_{ml2} + \ldots \alpha_{mn})/(T_{ml1} + T_{ml2} + \ldots T_{mn}) = \Sigma\alpha_{mn}/\Sigma T_{mn}$$

is formed, wherein the work W on the body of revolution (2) to which torque M is applied is determined from the equation $$W = \int_0^{2\pi} M d\phi = \overline{M} \cdot 2\pi \approx (\beta_m - \beta_{ml}) \cdot k,$$

k being a calibration constant and $\phi$ being the angle of rotation of the body of revolution (2), and wherein the average torque M exerted on the body of revolution (2) is determined from the equation $$\overline{M} = W/2\pi \approx (\beta_m - \beta_{ml}) \cdot k/2\pi.$$

2. The method as claimed in claim 1, wherein one or more further measurement cycles are carried out automatically after a measurement cycle has elapsed.

3. The method as claimed in claim 1, wherein the calibration constant k and/or the torque-free ratio $\beta_{ml}$ are determined in a separate procedure and are stored retrievably as constant storage values for each torque determination.

4. The method as claimed in claim 1, wherein, in order to form the torque-free ratio $\beta_{ml}$ or the applied-torque ratio $\beta_m$, the edge distances $T_{ml}$ or $T_m$ between the adjacent equally directed or the adjacent oppositely directed edges of the first square-wave signals (11) are summed up.

5. The method as claimed in claim 1, wherein, in order to form the torque-free ratio $\beta_{ml}$ or the applied-torque ratio $\beta_m$, the distances $\alpha_{ml}$ or $\alpha_m$ of specific edges of the first square-wave signals (11) from the adjacent equally directed or adjacent oppositely directed edges of the second square-wave signals (12) are summed up.

6. The method as claimed in claim 1, wherein, when the torque-free ratio $\beta_{ml}$ is formed, the distances $\alpha_{ml}$ between specific edges of the second square-wave signals (12) are compared with a specific predetermined edge distance $\alpha_{max}$, and wherein, if $\alpha_{ml} > \alpha_{max}$ is detected, the measurement cycle is discontinued and a new measurement cycle is commenced, in which, instead of the distances $\alpha_{ml}$, those distances $\alpha_{ml}'$ are summed up, the start of which corresponds to the start of $\alpha_{ml}$ and the ends of which are those oppositely directed edges of the second square-wave signals (12) which precede the ends of the distances $\alpha_{ml}$.

7. The method as claimed in claim 1, wherein, after the commencement of a measurement cycle for determining the torque the instantaneous rotational speed or angular speed of the body of revolution (2) is detected and compared with a specific limit value of the rotational speed or angular speed, and wherein the measurement cycle is discontinued if said speed falls short of the limit value.

8. The method as claimed in claim 1, wherein the specific torque is indicated on an indicator (14).

9. The method as claimed in claim 8, wherein, in addition to the torque, further quantities capable of being derived from the torque are indicated on the indicator (14).

10. A device for carrying out the method as claimed in claim 1, wherein the signals detected by the first and second measurement transducers (9, 10) are fed to an electronic computer unit which has memories for storing the torque-free ratio $\beta_{ml}$ and/or the calibration constant k and/or the specific limit value of the rotational speed or angular speed of the body of revolution (2) and/or the specific edge distance $\alpha_{max}$ and by which an output signal corresponding to the torque to be determined can be generated.

11. The device as claimed in claim 10, wherein an indicator unit is capable of being activated by the output signal from the computer unit.

12. The device as claimed in claim 10, wherein the electronic computer unit is a microcontroller (13) or a microcomputer.

13. The device as claimed in claim 10, wherein the first and/or the second measurement generators (3, 4) comprise fields having an optically different signal behavior and the first and/or the second measurement transducers (9, 10) are transducers detecting an optically different signal behavior.

14. The device as claimed in claim 13, wherein the first and/or the second measurement generators consist of a measuring disk (5, 6) or a measuring cylinder which has the fields with a different signal behavior on its radial plane face or on its cylindrical outer face.

15. The device as claimed in claim 14, wherein the fields have a different reflex behavior.

16. The device as claimed in claim 15, wherein the fields have alternately high and low reflection.

* * * * *